No. 793,500.                                    Patented June 27, 1905.

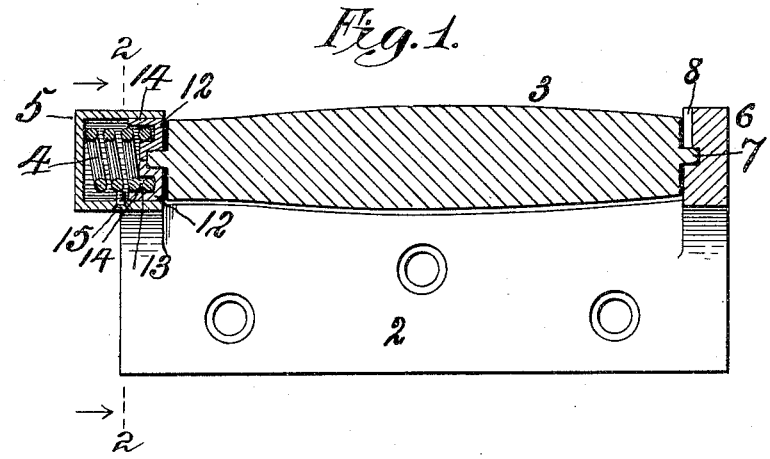
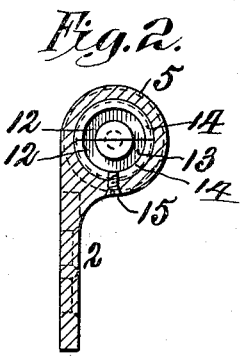
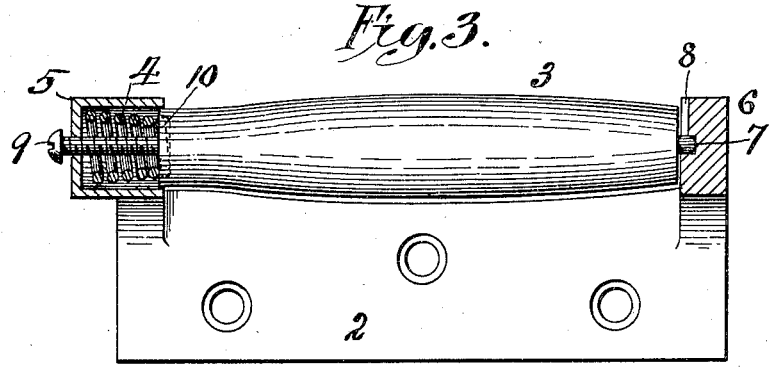

UNITED STATES PATENT OFFICE.

JAMES ELLIOT BAKER, OF NEW YORK, N. Y.

WHEEL-GUARD.

SPECIFICATION forming part of Letters Patent No. 793,500, dated June 27, 1905.

Application filed July 28, 1904. Serial No. 218,455.

*To all whom it may concern:*

Be it known that I, JAMES ELLIOT BAKER, a citizen of the United States, and a resident of New York, in the county of New York and State of New York, have invented certain new and useful Improvements in Wheel-Guards, of which the following is a specification.

My invention relates to wheel-guards designed more particularly for use on the bodies of vehicles whose wheels are provided with india-rubber tires; and the object of my invention is to provide an improved guard and one so constructed as to obviate rattling; and to these ends my invention consists in the construction, arrangement, and combination of parts, all as hereinafter described and claimed.

In the accompanying drawings, to which reference is made and which form a part of this specification, Figure 1 is a sectional view of my new wheel-guard. Fig. 2 is a sectional elevation on line 2 2 of Fig. 1, and Fig. 3 is a sectional elevation showing a modification.

In the drawings, 2 designates the main plate adapted to be bolted to the body of the vehicle, usually to the bottom thereof, and 3 designates a roller against which the wheel of the vehicle strikes or rubs in cramping the vehicle. One end of the roller is acted upon by a spring 4, inclosed in a chambered bearing 5, formed at one corner of the main plate 2, so that rattling of the roller in its bearings is obviated. At its opposite corner the main plate 2 is formed with a bearing 6 to receive the gudgeon 7 at the end of the roller 3, and by preference a shallow guide or channel 8 is formed in the face of this bearing to facilitate the work of putting the roller in place. The spring in the chamber of the bearing 5 thrusts the roller endwise and being a powerful spring sustains the adjacent end of the roller from contact with the box or bearing except when the wheel of the vehicle presses upon it. When the wheel of the vehicle presses upon the roller and the vehicle is moved either forward or backward, the tendency is for the wheel to shove the roller endwise. To prevent the roller from being thus unshipped from its bearings, I provide a stop at one end of the roller to prevent it from being shifted endwise beyond bounds. This stop is preferably in the form of a screw-bolt 9, threaded in the end of the chambered bearing. When the roller is to be put in place, the screw 9 is turned out sufficiently, the spring put in place, and then the end of the roller is pressed in against the pressure of the spring until the gudgeon 7 can be seated. This done, the screw 9 is turned in a sufficient distance to take the end thrust of the roller and prevent the gudgeon 7 from leaving its bearing. By preference a recess 10 is formed in the end of the roller to receive the end of the spring, so that the flange formed by the recess will support the roller on the end of the spring.

In the form shown in Figs. 1 and 2 the roller is formed with a gudgeon at each end and the chambered bearing is provided with a horizontally-divided journal-box composed of two segmental sections or halves 12 12, which are channeled, as shown at 13, to form flanges or keepers 14 for the end of the spring. The spring serves to thrust the outer surface of the sections of the divided box against the adjacent end of the roller and also to thrust the roller endwise to keep the gudgeon 7 firmly in place in its bearing, and that portion of the spring which is contained in the channels 13 of the split box or bearing has an opening action which spreads the two sections of the box into firm engagement with the walls of the chamber in which they are contained. A stop 15, preferably in the form of a screw, locks the divided journal-box and through it the roller in its bearings. This stop must be removed in assembling the parts and then replaced.

The roller is by preference tapered from the middle toward each end in order to lessen the tendency of the wheel to bind during contact.

Having thus described my invention, what I claim as new, and desire to secure by Letters Patent, is—

1. A wheel-guard for vehicles comprising a main plate having bearings one of which is chambered, a roller journaled in said bearings, a spring in said chambered bearing and a stop arranged in said chambered bearing to take the end thrust of the roller, substantially as described.

2. The chambered bearing and a spring held in said chamber, in combination with segmental bearing-blocks held in said chambered bearing and acted upon by said spring and a roller one end of which is journaled in said bearing-blocks, substantially as described.

3. The chambered bearing and a spring held in said chamber, in combination with the segmental bearing-blocks 12, 12 each formed with a flange 14 for the end of the spring and a roller one end of which is journaled in said segmental blocks, substantially as described.

JAMES ELLIOT BAKER.

Witnesses:
H. ALBERTUS WEST,
H. MERRILL.